Figure 13:
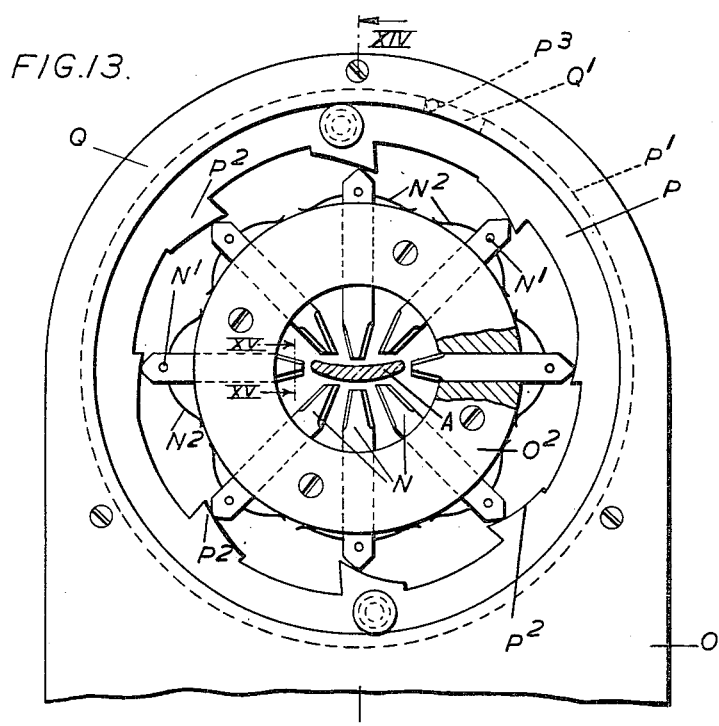

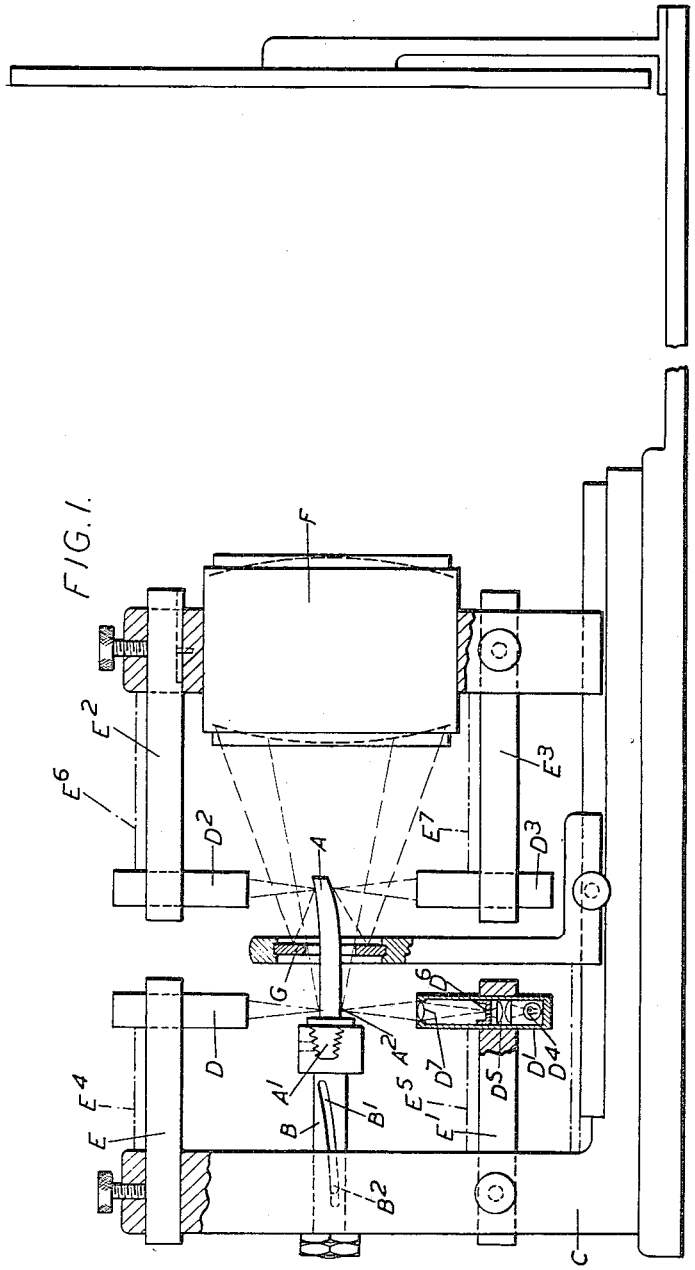

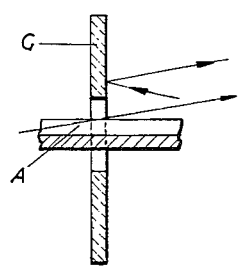
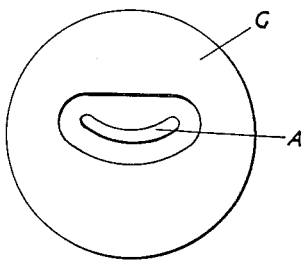
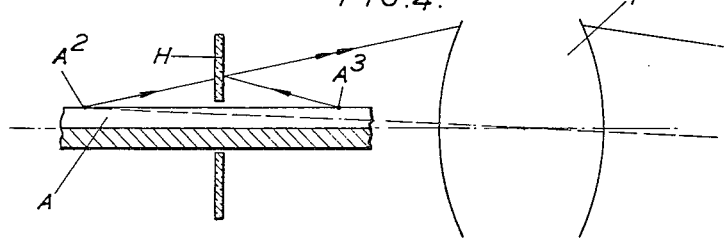
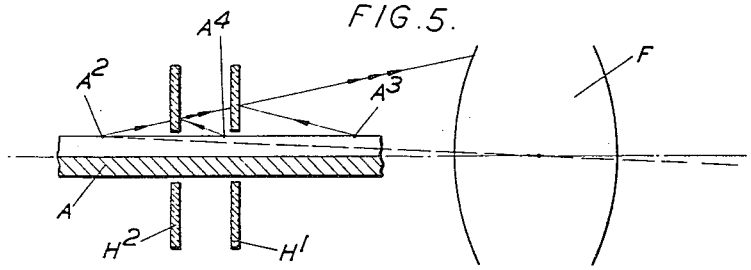
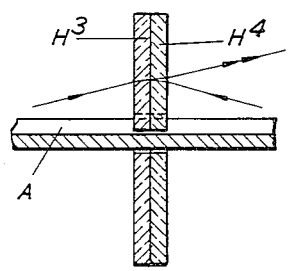
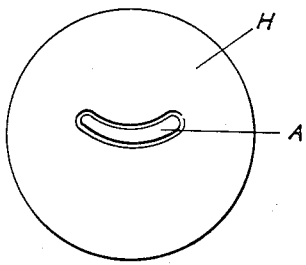

April 10, 1956  R. E. REASON ET AL  2,741,153
OPTICAL PROJECTION SYSTEMS
Filed Sept. 15, 1952  4 Sheets-Sheet 3
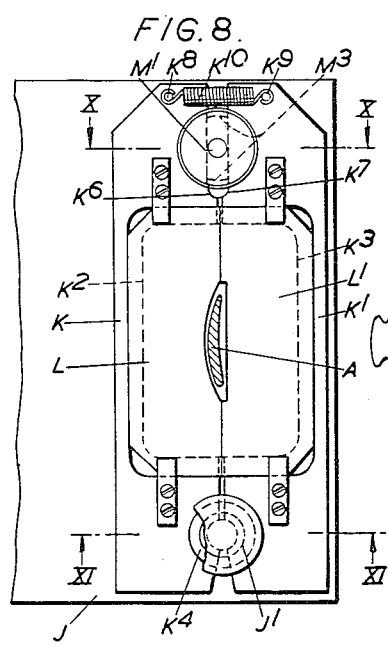
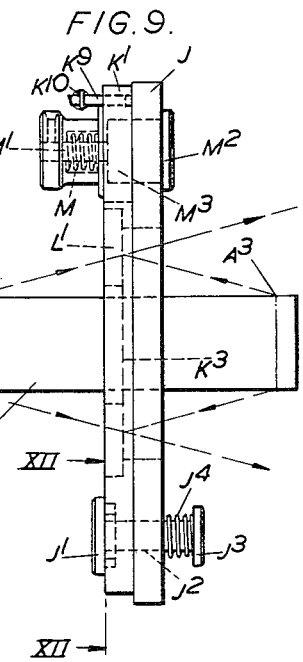
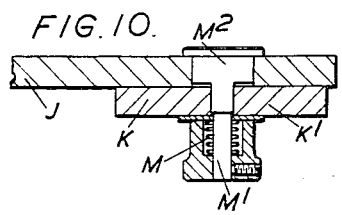
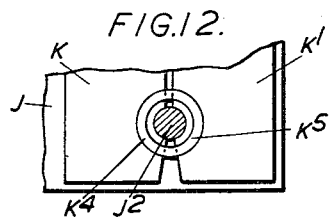
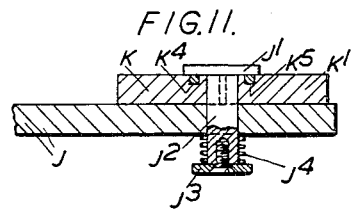
Inventor
RICHARD E. REASON
JOHN R. ADAMS
KENNETH R. COLEMAN
By Emery Holcombe & Blair
Attorney April 10, 1956   R. E. REASON ET AL   2,741,153
OPTICAL PROJECTION SYSTEMS
Filed Sept. 15, 1952   4 Sheets-Sheet 4

*Inventor*
RICHARD E. REASON
JOHN R. ADAMS
KENNETH R. COLEMAN
By Emery Holcombe & Blair
*Attorney*

United States Patent Office 2,741,153
Patented Apr. 10, 1956

2,741,153

OPTICAL PROJECTION SYSTEMS

Richard Edmund Reason, John Reginald Adams, and Kenneth Roy Coleman, Leicester, England, assignors to Kapella Limited, Leicester, England, a British company Application September 15, 1952, Serial No. 309,606

Claims priority, application Great Britain September 18, 1951

12 Claims. (Cl. 88—24)

This invention relates to optical projection systems, primarily intended for use in optical apparatus for measuring or testing the accuracy of plane section profiles. In one known arrangement of such apparatus, an illuminating device is employed to produce on the surface of a body to be examined a line of light which defines the plane section profile thereon, and an optical projection system is provided to form an image of such illuminated section profile in an image plane, for example on a projection screen, where it can be accurately measured or compared with a standard profile.

This invention, although not limited thereto, is more especially intended for use in apparatus for the examination of bodies, such as turbine blades, for which it is desirable to measure or test not only the shapes and sizes of individual plane section profiles but also the positions of such profiles relatively to one another.

The present invention is concerned with an optical system for simultaneously projecting on to a single image plane images of the profiles of two or more plane sections of a body in planes parallel to but at different distances from such image plane, and the system according to the invention comprises one or more plane reflectors associated with individual section profiles and so located as to bring reflected images thereof all into a single object plane, and an objective for projecting an image from such object plane on to the image plane. The object plane may conveniently coincide with the plane of the section profile furthest from the objective, the number of plane reflectors being one less than the number of section profiles.

The plane reflectors may be totally reflecting and so shaped as to act as partial screens for segregating zones of the objective for association with individual section profiles. Such zones may be annular, the inner edge of each reflector being spaced away from the body to be examined, so that rays from the section profile associated with the reflector pass to an annular zone of the objective whilst rays from another section profile pass through the space between the reflector and the body to an inner zone of the objective. Alternately, the zones may be generally sector-shaped, each reflector being formed of a number of angularly spaced elements approximately of sector shape.

In another arrangement, the plane reflectors are partially transparent over their whole field, and in such case the transmittance of the partially transparent reflectors is preferably graded from reflector to reflector so that the intensity of the beam of light passing through the objective from any one section profile is substantially the same as that for any other section profile. In order to obtain adequate brightness of the image, and also to make it possible to project an image of the complete section profiles around the whole periphery of the body, it will usually be desirable for each reflector to have a central opening shaped to conform closely to the peripheral shape of the body at the position at which the reflector is to be mounted.

When the bodies to be examined are of relatively complex shape, as for example in the case of turbine blades, difficulty may be experienced in loading the bodies into position in the reflector assembly without fouling the reflectors. For it will usually be desirable to coat the surface of the body with a matt film to increase the light intensity of the rays used for projecting the image, and it is therefore especially important to avoid any rubbing of the body surface against the edges of the openings in the reflectors. In some instances the shape of the body may be such that this difficulty can be overcome by accurately guiding the loading movement of the body, and this will usually suffice when using totally reflecting reflectors arranged for annular zone segregation.

In the case of radial zone segregation, the difficulty can be met by so mounting the sector-shaped elements of each reflector that they can be moved in a plane at right angles to the optical axis of the objective towards and away from such axis. Thus the elements may be mounted to slide in approximately radial guides under the control of cams carried by a rotatable ring.

In the case of partially transparent reflectors, it will usually be desirable to form each reflector in two or more parts which can be moved towards or away from each other in a plane at right angles to the optical axis of the objective, in order to provide the requisite clearances for the loading movement. In one convenient arrangement for this purpose, the mounting for each reflector comprises a plane guide surface lying accurately at right angles to the optical axis of the objective, and movable frames which can slide over such guide surface and are spring-pressed into engagement therewith, the reflector parts being so mounted respectively in the frames that their reflecting surfaces lie accurately parallel to the plane of engagement of the frames with the guide surface.

In practice it will usually be desirable for the apparatus to be such that bodies of different sizes and shapes can be examined. This can often be satisfactorily achieved by providing a different reflector assembly for each different size and shape of body with which the apparatus is required to deal. Alternatively, means may be provided whereby the positions of the reflectors can be adjusted in the direction of the optical axis of the objective to suit different spacings between the planes of the section profiles. In such case, when the reflectors have central openings conforming to the contour of the body, the reflector mountings may be axially adjustable, each reflector being detachably fitted in its mounting, so that it can be removed when the mounting is adjusted and replaced by another reflector whose central opening conforms to the peripheral shape of the body in the adjusted position.

Figure 14:
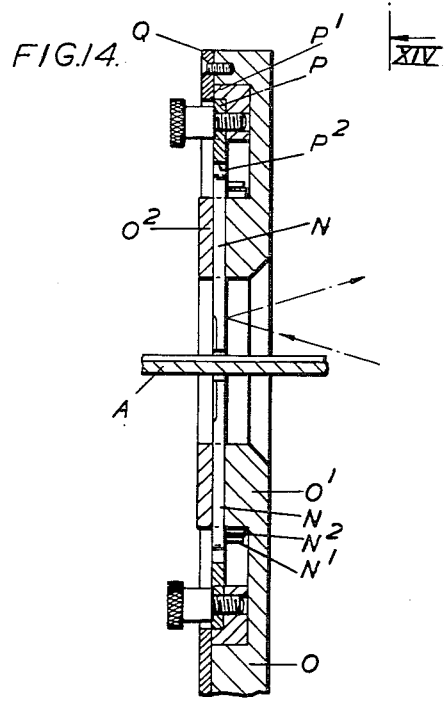
Figure 15:

The invention may be carried into practice in various ways, but some convenient alternative practical examples according thereto are illustrated in the accompanying drawings. These examples are shown, for convenience, as applied to their use for testing the accuracy of manufacture of turbine blades of aerofoil section, wherein it is necessary to check not only the shapes of individual spaced sections of the blade, but also the relative angular positions of such sections. For this purpose, it will often be sufficient in practice to examine simultaneously the profiles of two sections respectively near the two ends of the blade, whilst for a more thorough test a third section near the middle of the blade may also be examined at the same time. Whilst in some instances it may suffice to examine one face only of the blade, it will more usually be important to examine the complete section profiles round the whole perimeter of the blade. The arrangements illustrated make this possible, and are also such that they can readily be adjusted to deal with different sizes of blade, for which of course different spacing between the section planes will be required. In the drawings, Figure 1 shows a general view of one convenient construction of the apparatus according to the invention, to which the alternative reflector arrangements illustrated in the remaining figures can be applied, parts being shown in section to show their arrangement more clearly, Figures 2 and 3 show, respectively in section and in face view, the reflector arrangement indicated in Figure 1, Figure 4 is a diagrammatic view of part of an alternative arrangement employing a partially transparent reflector, Figure 5 is a similar view of the arrangement of Figure 4 as applied to the examination of three section profiles instead of two, Figure 6 is a sectional view of a preferred form of partially transparent reflector, Figure 7 shows any one of the reflectors of Figures 4–6 in face view, Figures 8 and 9 are two views at right angles of a preferred practical mounting for a partially transparent reflector, Figures 10, 11 and 12 are sections respectively on the lines X—X and XI—XI of Figure 8 and XII—XII of Figure 9, and Figures 13–15 illustrate a further alternative arrangement employing a divided fully reflecting reflector, Figure 13 showing the reflector and its mounting in face view, whilst Figures 14 and 15 are sectional views respectively on the lines XIV—XIV and XV—XV of Figure 13.

In the apparatus shown in Figure 1, the turbine blade A to be examined is detachably mounted by its root $A^1$ in a chuck or other holder B movably mounted on the fixed base C of the apparatus, the arrangement being such that, when the holder B has been properly positioned, the chosen plane section $A^2$ nearest the root of the blade A will always occupy the same plane relatively to the fixed base C, whatever the size and shape of the blade.

The fixed base C also carries an illuminating device for defining the section profiles on the surface of the blade A, the example illustrated being arranged to provide two section profiles, one $A^2$ in the fixed plane above mentioned and the other $A^3$ towards the tip of the blade. The illuminating device (which in itself forms no part of the present invention) may be arranged in various ways, but in the example illustrated comprises four similar illuminators $DD^1D^2D^3$, two of which $DD^1$ serve to define the section profile $A^2$ from opposite sides of the blade, whilst the other two $D^2D^3$ similarly define the section profile $A^3$. The four illuminators $DD^1D^2D^3$ are respectively carried on four arms $EE^1E^2E^3$ mounted to slide in suitable guides carried by the fixed base C, the arms being held against rotation either by their cross-sectional shape or by suitable keying. In practice, the arms $EE^1E^2E^3$ are adjusted in their slides to suit the particular blade A being tested, distance pieces $E^4E^5E^6E^7$ being used for accurate setting, the arms when correctly adjusted being clamped in position. Each illuminator comprises a source of light $D^4$ with a suitable condensing lens $D^5$, a mask $D^6$ in the form of a slit or knife edge shaded to suit the section profile, and a lens $D^7$ for focussing an image of the mask $D^6$ on the surface of the blade A. In order to increase the light intensity of the rays used for projecting the images of the section profiles thus defined, it will usually be desirable to coat the blade surface with a matt white film, such for example as a film of magnesium oxide.

The present invention is concerned with the simultaneous projection of images of the two or more section profiles onto a single image plane, where such images can be measured or compared with standard profiles. It has already been mentioned that the section plane $A^2$ nearest the root of the blade A always occupies the same position relatively to the fixed base C, and such plane is used as the object plane of the optical projecting system F, the optical axis of such system being at right angles to the object plane. Plane reflectors are used (as will be described in detail below) to image the other section profile $A^3$ or profiles on to this same object plane $A^2$, and it will be at once clear that this enables a projecting objective F simultaneously to focus images of all the section profiles accurately on a single image plane. The objective F may be arranged to produce enlarged images of the section profiles $A^2A^3$ on a projection screen $F^1$, which may if desired bear markings of standard blade section profiles for comparison purposes, or alternatively may produce a small image in the image plane for viewing through a microscope, which may be provided with a graticule bearing the standard markings.

The various alternative arrangements according to the invention differ from one another in respect of the arrangement of the reflectors. In all cases, since the section profile $A^2$ nearest the root of the blade A is directly projected without the use of a reflector, the number of reflectors used will be one less than the number of section profiles, so that if two section profiles only are to be projected, as shown, only one reflector will be needed, whilst if there are three section profiles, two reflectors will be used, each reflector being mounted with its reflecting surface in a plane half-way between the plane of the section profile and the common object plane, due allowance being made where necessary for the thickness of any glass through which the rays have to pass. The reflector, or each reflector, is carried on a bracket $C^1$ mounted to slide on a slideway $C^2$ on the fixed base C, to enable it to be adjusted to the correct position, a distance piece $C^3$ preferably being used for accurate setting.

In the example indicated in Figure 1 and shown on a larger scale in Figures 2 and 3, the reflector (or each partial reflector if made in separable parts) consists of an ordinary fully reflecting mirror G with front surface reflection. This reflector G is associated, in the example illustrated, with the section profile $A^3$ near the tip of the blade and acts as a screen to cut off part of the beam from the other section profile $A^2$, so that the section profiles are associated with annular zones of the projection objective F. Although it would be possible for the reflector G to fit closely round the blade A and to have relatively limited external radial dimensions, so that the innermost zone would be occupied by the rays from the section profile $A^3$ nearest the tip of the blade and the outermost zone by the rays from the section profile $A^2$ nearest the root of the blade, it will usually be more convenient, as shown, to adopt the reverse arrangement, the inner edge of the reflector G being spaced away from the blade to permit the passage of the rays from the section profile $A^2$ to the innermost zone of the objective, the rays from the profile $A^3$ being confined to the outermost zone. This latter arrangement has the advantage that the central opening in the reflector will usually be large enough to facilitate loading of the blade into position without fouling the reflector, especially if (as shown in Figure 1) the blade holder B is provided with a helical groove $B^1$ coacting with a fixed pin $B^2$, so that the blade will twist somewhat in its axial movement into or out of the operative position to an extent suited to the shape of the blade. The size and shape of the central opening in the reflector G (or of each reflector, if there is more than one) are so chosen as to give approximately equal light intensities for the images of the individual section profiles. Some degree of latitude is permissible in this respect, however, so that it will often be practicable to cater for different sizes of blade by axial adjustment of the reflector (as shown in Figure 1) without need for substitution of another reflector having a central opening of different size or shape.

Instead of using a fully reflecting mirror as the reflector it will often be preferable to employ a partially transparent reflector, consisting for example of a plate of glass partially metallised over the whole area of one surface, so that part of the light incident on the partially reflecting surface is transmitted through the surface and part is reflected. Such an arrangement is shown in Figure 4 for the case of one reflector H, whilst Figure 5 shows a similar arrangement with two reflectors $H^1H^2$ for dealing with three section profiles, the third section profile $A^4$ being somewhat displaced from halfway between the section profiles $A^2$ and $A^3$ so as to be clear of the reflector H. The reflector H, or each reflector $H^1$ or $H^2$, is located with its metallised surface slightly displaced from the halfway position between the fixed section profile $A^2$ and its associated section profile $A^3$ or $A^4$ to allow for the slight difference in ray paths due to the thickness of the glass.

It is desirable to grade the transmittance of the reflectors, in order to obtain substantially the same light intensity in the images of the individual section profiles. Thus in the arrangement of Figure 4, the one reflector H should have 50 per cent transmittance, so that the intensities of the two emergent beams from the two section profiles $A^2A^3$ should be equal to one another. In the arrangement of Figure 5, the reflector $H^2$ nearest to the object plane of the objective F should have 50 per cent transmittance, so that the emergent beams respectively from the section profiles $A^2$ and $A^4$ will have equal intensities. The other reflector $H^1$ however should have 66⅔ per cent transmittance, so that the intensities of the beams from the first two section profiles $A^2A^4$, already reduced to half at the first reflector $H^2$, will be reduced to one-third of their original values on transmission through the second reflector $H^1$, whilst the intensity of the beam from the third section profile $A^3$ will likewise be reduced to one-third on reflection at the second reflector $H^1$. If there were a third reflector, its transmittance should be 75 per cent, the intensity of each beam being reduced to a quarter of its original value, and so on.

Figure 6 shows a preferred practical form of partially transparent reflector comprising two glass plates $H^3H^4$ in contact with one another, having one of the two contacting surfaces provided with the metallised coating. This arrangement, not only affords protection against damage to the metallised coating, but also has the advantage of equalising the transmitted and reflected ray paths, so that the metallised surface should be located exactly halfway between its associated section profile and the object plane of the objective F.

It is important that each reflector H (or $H^1$ or $H^2$ or $H^3H^4$) should surround the blade A with as little clearance as is practicable, as indicated in Figure 7. This, however, will often give rise to practical difficulty in loading the blade into position within the reflector assembly, owing to the twist of the blade, for it is important that during loading the blade should not rub against the edge of the central hole in the reflector.

It will be appreciated, therefore, that it is only with certain shapes of turbine blade, wherein the twist is suitable, that it is practicable to make the reflector in one piece. In such case it is important to provide a generally helical guide track $B^1$, suited to the twist of the blade A, so that as the blade holder B is moved axially into its operative position it will automatically turn on its axis to the correct degree to ensure that the blade will pass through the central opening in the reflector H (or in each reflector if more than one is provided) without touching the edge thereof.

Generally, however, it is preferable to divide the reflector (or each reflector) into two parts movable towards or away from one another in a plane at right angles to the optical axis of the projecting system. It is important in this arrangement to ensure that the two parts of the reflector are accurately located in their operative positions, and one convenient arrangement to this end (shown in Figures 8-12) comprises a main supporting apertured plate J formed with a true plane surface and mounted so that such surface lies accurately at right angles to the axis, and two frames $KK^1$ carried by the supporting plate J respectively for carrying the two parts $LL^1$ of the reflector. Each of these frames $KK^1$ is spring-pressed into engagement with the plane surface on the plate J and has an opening provided with a shoulder $K^2$ or $K^3$ accurately parallel to the plane of engagement of the frame with the plate J, the reflector part L or $L^1$ being fitted into such opening in close engagement with the shoulder $K^2$ or $K^3$. The openings in the two frames $KK^1$ register laterally with one another so that, in the operative position, the two reflector parts $LL^1$ are close together and present an almost continuous reflecting surface accurately located in the correct position.

The two frames $KK^1$ are pivoted together at one end, for example by means of a ring $J^1$ engaging in arcuate recesses $K^4K^5$ cut in the outer surfaces of the frames $KK^1$ at their contiguous edges, such ring $J^1$ being attached to a pivot pin $J^2$ which passes between the edges of the frames and through a bearing hole in the supporting plate J to a head $J^3$ which is spring-pressed away from the plate J, such spring $J^4$ constituting one of two springs for urging the frames $KK^1$ into engagement with the plane surface of the plate J. The second spring M is at the other end of the frames and likewise surrounds a pin $M^1$ passing through a bearing hole in the plate J. A head $M^2$ on this second pin $M^1$ has projections $M^3$ engaging between the contiguous edges $K^6K^7$ of the frames $KK^1$ so that when the head $M^2$ is rotated it will force the two frames apart. The two frames $KK^1$ have lugs $K^8K^9$ carrying the ends of a tension spring $K^{10}$ for pulling the two frames towards one another into engagement with the pin $M^1$ and the projections $M^3$ on its head $M^2$.

Thus, in the operative position, the two frames $KK^1$ are pulled together into engagement with the pin $M^1$ and in this position the edges of the two reflector parts $LL^1$ lie close together and surround the blade A with only slight clearance. When the blade A is to be loaded into position or removed therefrom, the head $M^2$ on the second pin $M^1$ is rotated to force the frames $KK^1$ apart sufficiently to enable the blade A to be inserted or withdrawn axially without touching the edges of the reflector parts $LL^1$. A relatively small separating movement of the frames will usually suffice, provided that the blade A in its loading movement is appropriately guided by a generally helical guide slot $B^1$ in the manner above-mentioned to suit its twist. In practice, it is desirable to provide an interlock to prevent movement of the blade until the reflector parts $LL^1$ have been separated. For example, such separation may operate an electric switch for energising a solenoid controlling a detent engaging with the blade holder.

The slight break in the continuity of the reflector $LL^1$ at the edges of its parts will not in practice interfere very seriously with the proper projection of the image of the complete blade section profile. Such break can be arranged to be adjacent to any desired portion of the blade section and need not be adjacent to the leading and trailing edges of the blade.

It will usually be desirable, as mentioned above, for the apparatus to be readily adjustable for dealing with different sizes and shapes of blade. If the number of sizes and shapes to be dealt with is small, the simplest arrangement is to make the complete reflector assembly detachable from the fixed base, and to provide a set of interchangeable assemblies, one or each different size or shape of blade.

More generally, it is preferable to make the individual reflectors or reflector parts detachable from their mountings, a set of interchangeable reflectors being provided as required, and to provide for axial adjustment of the mountings as indicated in Figure 1 to suit different spacings between the section profile planes.

Figures 13-15 show another reflector construction, employing full reflection, wherein the reflector is constituted by a number of reflecting elements N having generally sector-shaped inner ends, radiating from the optical axis of the projection system F and angularly spaced apart from one another. Each element N slides in a radial groove in an annular boss $O^1$ on the reflector mounting O and is held therein by a cover plate $O^2$ secured to the boss $O^1$. At its outer end, each element N carries a pin $N^1$ which is pressed outwardly by a spring $N^2$ abutting against the outer surface of the boss $O^1$. A cam plate P, attached to a rotatable ring $P^1$ housed in an outer recess in the mounting O, has a number of inwardly directed cam projections $P^2$ each cooperating with the outer end of one of the reflector elements N, the springs $N^2$ serving to keep the elements N in engagement with the cam projections $P^2$. An annular retaining cover Q attached to the outer portion of the mounting O serves to keep the rotatable ring $P^1$ in place. This cover Q also has a recess $Q^1$ in its inner edge, in which engages a projection $P^3$ on the rotatable ring $P^1$, so that the ends of the recess $Q^1$ afford stops to limit the rotation of the ring $P^1$.

With this arrangement, the sector-shaped inner ends of the elements N, in their operative position, are pressed inwardly by the cam projections $P^2$ so as to lie close to the surface of the blade A. The sectors are angularly spaced apart so as to occupy approximately 50 per cent of the area (assuming there is only one reflector), so that the intensity of the light beam reflected by the elements N from the section profile $A^3$ is approximately equal to the intensity of the light beam transmitted through the gaps between the sectors from the section profile $A^2$. The projection system F is thus divided into radial zones appropriate to the individual section profiles. The back of each element N is chamfered off at its edges, as shown in Figure 15, so as to interfere to a minimum extent with the rays from the section $A^2$. When the blade A is to be loaded into position or withdrawn therefrom, the rotatable ring $P^1$ is rotated, so that its projection $P^3$ comes to the other end of the slot $Q^1$. This rotates the cam plate P, so that the elements N are moved outwardly by their springs $N^2$ to provide adequate clearance for movement of the blade A.

It will be appreciated that the foregoing arrangements may be modified in various ways within the scope of the invention and may be employed for the examination of section profiles of bodies other than turbine blades.

What we claim as our invention and desire to secure by Letters Patent is:

1. An optical system for simultaneously projecting on to a single image plane images of the profiles of a plurality of plane sections of a body in planes parallel to but at different distances from such image plane, comprising reflecting means for superimposing images of individual section profiles in a single object plane, such reflecting means consisting of at least one plane partial reflector divided into parts lying in a single plane and spaced around the body under examination, said reflector plane being parallel to said image plane, a single objective having its optical axis perpendicular to the said planes for projecting an image from such object plane on to the image plane, mounting means whereby the reflector parts can be moved towards or away from each other in a plane at right angles to the optical axis of the objective, and means for adjusting the reflecting means in the direction of the optical axis, the mounting means comprising at least one guide surface defining a plane lying accurately at right angles to the optical axis and guiding means whereby the reflector parts can be caused to slide over such guide surface while maintaining exact parallelism therewith.

2. An optical system as claimed in claim 1, in which the said guiding means comprises movable frames which can slide over the guide surface, spring means urging the frames into engagement with the guide surface, and means for mounting the reflector parts respectively in the movable frames with their reflecting surfaces accurately parallel to the guide surface.

3. An optical system as claimed in claim 1, in which the said plane reflector is totally reflecting and is divided into a number of angularly spaced elements each approximately of sector shape, whereby the reflector acts as partial screening means for segregating sector-shaped zones of the objective for association with individual section profiles.

4. An optical system as claimed in claim 3, in which the said mounting means for the reflector parts comprises approximately radial guides along which the elements can slide, a rotatable ring, and cams carried by such ring for controlling the movements of the elements in their guides.

5. An optical system as claimed in claim 1, in which the said plane partial reflector is partially transparent over its whole field and its parts in their operative positions fit closely together and form a central opening which completely surrounds the periphery of the body under examination and conforms closely to the peripheral shape thereof.

6. An optical system as claimed in claim 5, in which the said guiding means comprises movable frames which can slide over the guide surface, and means for detachably mounting the reflector parts respectively in the movable frames.

7. An optical system for simultaneously projecting on to a single image plane images of the profiles of a plurality of plane sections of a body in planes parallel to but at different distances from such image plane, comprising a single objective having its optical axis perpendicular to the said image plane for projecting an image on to the image plane from an object plane coincident with the plane of the section profile furthest from the objective, a plane partial reflector associated with each other section profile for bringing a reflected image of the associated profile into such object plane, the number of plane partial reflectors thus being one less than the number of section profiles, each such reflector being divided into parts around the body under examination, and mounting means whereby such parts can be moved towards or away from each other in a plane at right angles to the optical axis of the objective, such mounting means including movable frames constrained to move in a plane at right angles to the optical axis and means whereby the reflector parts are detachably mounted respectively in the movable frames.

8. An optical system as claimed in claim 7, in which each plane partial reflector is partially transparent over its whole field and has transmittance such that the intensity of the beam of light passing through the objective from any one section profile is approximately the same as that from any other section profile.

9. An optical system as claimed in claim 7, including means for independently adjusting each plane partial reflector in the direction of the optical axis of the objective to suit different spacings between the planes of the section profiles.

10. An optical system for simultaneously projecting on to a single image plane images of the profiles of a plurality of plane sections of a body in planes parallel to but at different distances from such image plane, comprising a single objective having its optical axis perpendicular to the said image plane for projecting an image on to the image plane from an object plane, and reflecting means for superimposing images of individual section profiles in such object plane, such reflecting means comprising at least one totally reflecting plane reflector divided into a number of angularly spaced elements each approximately of sector shape, whereby the reflecting means acts as partial screening means for segregating sector-shaped zones of the objective for association with individual section profiles.

11. An optical system as claimed in claim 10, including mounting means for the reflector elements whereby such elements can be moved in a plane at right angles to the optical axis of the objective towards or away from such axis.

12. An optical system as claimed in claim 10, including means for adjusting the said plane reflector in the direction of the optical axis of the objective to suit different spacings between the planes of the section profiles.

References Cited in the file of this patent

UNITED STATES PATENTS

| | | |
|---|---|---|
| 706,297 | De Bruyn | Aug. 5, 1902 |
| 2,349,989 | Reason | May 30, 1944 |
| 2,574,119 | Mottu | Nov. 6, 1951 |
| 2,607,267 | Fultz | Aug. 19, 1952 |
| 2,629,936 | Cronstedt | Mar. 3, 1953 |